(12) United States Patent
Boyd et al.

(10) Patent No.: US 7,631,050 B2
(45) Date of Patent: Dec. 8, 2009

(54) METHOD FOR CONFIRMING IDENTITY OF A MASTER NODE SELECTED TO CONTROL I/O FABRIC CONFIGURATION IN A MULTI-HOST ENVIRONMENT

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven W. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 11/260,624

(22) Filed: Oct. 27, 2005

(65) Prior Publication Data

US 2007/0101016 A1 May 3, 2007

(51) Int. Cl.
*G06F 15/16* (2006.01)
(52) U.S. Cl. ..................................... 709/208
(58) Field of Classification Search .................. 709/208, 709/225, 227
See application file for complete search history.

(56) References Cited

U.S. PATENT DOCUMENTS 5,257,353 A 10/1993 Blanck et al.

(Continued)

FOREIGN PATENT DOCUMENTS

WO 2006089914 A1 8/2006

OTHER PUBLICATIONS

U.S. Appl. No. 11/066,424, filed Feb. 25, 2005, Arndt et al.

(Continued)

*Primary Examiner*—Scott M Sciacca
(74) *Attorney, Agent, or Firm*—Yee & Associates, P.C.; Matthew W. Baca

(57) ABSTRACT

In a distributed computer system having multiple root nodes, a challenge protocol is provided, for use in determining or confirming the root node in which a PCI Configuration Manager (PCM) actually resides. This node is referred to as the master node. The challenge procedure is activated whenever the identity of the PCM, which is determined by the root node in which it resides, appears to be uncertain. The challenge procedure resolves this uncertainty, and enables the PCM to continue to configure routings throughout the system. In a useful embodiment, a method is directed to a distributed computer system of the above type which is further provided with PCI switches and with adapters that are available for sharing by different nodes. The method includes the steps of selecting a first one of the root nodes to be master root node, and operating the first root node to query the configuration space of a particular one of the PCI switches. The method further includes detecting information indicating that a second root node is considered to be the master root node for the particular switch. A challenge protocol is implemented in response to this detected information, to seek confirmation that the first root node is the master root node. The configuration space querying procedure is continued if the first root node is confirmed to be the master root node, and is otherwise aborted.

20 Claims, 7 Drawing Sheets

U.S. PATENT DOCUMENTS

| | | | |
|---|---|---|---|
| 5,367,695 A * | 11/1994 | Narad et al. | 709/210 |
| 5,392,328 A | 2/1995 | Schmidt et al. | |
| 5,960,213 A * | 9/1999 | Wilson | 710/2 |
| 5,968,189 A | 10/1999 | Desnoyers et al. | |
| 6,061,753 A | 5/2000 | Ericson | |
| 6,073,195 A * | 6/2000 | Okada | 710/301 |
| 6,662,251 B2 | 12/2003 | Brock et al. | |
| 6,691,184 B2 | 2/2004 | Odenwald et al. | |
| 6,769,021 B1 | 7/2004 | Bradley et al. | |
| 6,775,750 B2 | 8/2004 | Krueger | |
| 6,813,653 B2 | 11/2004 | Avery | |
| 6,907,510 B2 | 6/2005 | Bennett et al. | |
| 7,036,122 B2 | 4/2006 | Bennett et al. | |
| 7,096,305 B2 | 8/2006 | Moll | |
| 7,103,064 B2 | 9/2006 | Petty et al. | |
| 7,134,052 B2 | 11/2006 | Bailey et al. | |
| 7,174,413 B2 | 2/2007 | Pettey et al. | |
| 7,188,209 B2 | 3/2007 | Pettey et al. | |
| 7,194,538 B1 | 3/2007 | Rabe et al. | |
| 7,363,389 B2 | 4/2008 | Collins et al. | |
| 7,398,337 B2 | 7/2008 | Arndt et al. | |
| 2002/0138677 A1 * | 9/2002 | Brock et al. | 710/110 |
| 2002/0144001 A1 | 10/2002 | Collins et al. | |
| 2002/0161937 A1 | 10/2002 | Odenwald et al. | |
| 2002/0188701 A1 | 12/2002 | Brown et al. | |
| 2003/0221030 A1 | 11/2003 | Pontius et al. | |
| 2004/0015622 A1 | 1/2004 | Avery | |
| 2004/0025166 A1 | 2/2004 | Adlung et al. | |
| 2004/0039986 A1 | 2/2004 | Solomon et al. | |
| 2004/0123014 A1 | 6/2004 | Schaefer et al. | |
| 2004/0172494 A1 | 9/2004 | Pettey et al. | |
| 2004/0179534 A1 | 9/2004 | Pettey et al. | |
| 2004/0210754 A1 | 10/2004 | Barron et al. | |
| 2004/0230709 A1 | 11/2004 | Moll | |
| 2004/0230735 A1 | 11/2004 | Moll | |
| 2005/0025119 A1 | 2/2005 | Pettey et al. | |
| 2005/0044301 A1 | 2/2005 | Vasilevsky et al. | |
| 2005/0102682 A1 | 5/2005 | Shah et al. | |
| 2005/0147117 A1 | 7/2005 | Pettey et al. | |
| 2005/0188116 A1 | 8/2005 | Brown et al. | |
| 2005/0228531 A1 | 10/2005 | Genovker et al. | |
| 2005/0270988 A1 | 12/2005 | DeHaemer | |
| 2006/0168361 A1 | 7/2006 | Brown et al. | |
| 2006/0179195 A1 | 8/2006 | Sharma et al. | |
| 2006/0184711 A1 | 8/2006 | Pettey et al. | |
| 2006/0195617 A1 | 8/2006 | Arndt et al. | |
| 2006/0195675 A1 | 8/2006 | Arndt et al. | |
| 2006/0206655 A1 | 9/2006 | Chappell et al. | |
| 2006/0206936 A1 | 9/2006 | Liang et al. | |
| 2006/0212608 A1 | 9/2006 | Arndt et al. | |
| 2006/0212620 A1 | 9/2006 | Arndt et al. | |
| 2006/0212870 A1 | 9/2006 | Arndt et al. | |
| 2006/0230181 A1 | 10/2006 | Riley | |
| 2006/0230217 A1 | 10/2006 | Moll | |
| 2006/0239287 A1 | 10/2006 | Johnsen et al. | |
| 2006/0242333 A1 | 10/2006 | Johnsen et al. | |
| 2006/0242352 A1 | 10/2006 | Torudbakken et al. | |
| 2006/0242353 A1 * | 10/2006 | Torudbakken et al. | 710/316 |
| 2006/0242354 A1 | 10/2006 | Johnsen et al. | |
| 2006/0253619 A1 | 11/2006 | Torudbakken et al. | |
| 2007/0019637 A1 | 1/2007 | Boyd et al. | |
| 2007/0027952 A1 | 2/2007 | Boyd et al. | |
| 2007/0097871 A1 | 5/2007 | Boyd et al. | |
| 2007/0097948 A1 | 5/2007 | Boyd et al. | |
| 2007/0097949 A1 | 5/2007 | Boyd et al. | |
| 2007/0097950 A1 | 5/2007 | Boyd et al. | |
| 2007/0136458 A1 | 6/2007 | Boyd et al. | |

OTHER PUBLICATIONS

U.S. Appl. No. 11/066,645, filed Feb. 25, 2005, Arndt et al.
U.S. Appl. No. 11/065,869, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/065,823, filed Feb. 25, 2005, Arndt et al.
U.S. Appl. No. 11/054,274, filed Feb. 9, 2005, Flood et al.
U.S. Appl. No. 11/055,850, filed Feb. 11, 2005, Bishop et al.
U.S. Appl. No. 11/054,889, filed Feb. 10, 2005, Frey et al.
U.S. Appl. No. 11/054,871, filed Feb. 10, 2005, Griswell et al.
U.S. Appl. No. 11/055,831, filed Feb. 11, 2005, Bishop et al.
U.S. Appl. No. 11/056,691, filed Feb. 11, 2005, Le et al.
U.S. Appl. No. 11/056,878, filed Feb. 12, 2005, Bishop et al.
U.S. Appl. No. 11/056,692, filed Feb. 11, 2005, Floyd et al.
U.S. Appl. No. 11/049,342, filed Feb. 2, 2005, Lloyd et al.
U.S. Appl. No. 11/053,529, filed Feb. 8, 2005, Flood et al.
U.S. Appl. No. 11/140,648, filed May 27, 2005, Mack et al.
U.S. Appl. No. 11/340,447, filed Jan. 26, 2006, Boyd et al.
U.S. Appl. No. 11/334,678, filed Jan. 18, 2006, Boyd et al.
U.S. Appl. No. 11/348,903, filed Feb. 7, 2006, Boyd et al.
U.S. Appl. No. 11/351,020, filed Feb. 9, 2006, Boyd et al.
U.S. Appl. No. 11/567,411, filed Dec. 6, 2006, Boyd et al.
U.S. Appl. No. 11/567,425, filed Dec. 6, 2006, Boyd et al.

* cited by examiner

| | BDF# OF PCM THAT IS CURRENT MASTER OF SWITCH (PCM ID) | | |
|---|---|---|---|
| | NUMBER OF PORTS | | |
| PORT 1 | ACTIVE/INACTIVE | TREE INIT/NOT | ROOT COMPLEX/SWITCH/ENDPOINT |
| PORT 2 | 610 | 612 | 614 |
| PORT 3 | | | |
| ⋮ | ⋮ | ⋮ | ⋮ |

METHOD FOR CONFIRMING IDENTITY OF A MASTER NODE SELECTED TO CONTROL I/O FABRIC CONFIGURATION IN A MULTI-HOST ENVIRONMENT

BACKGROUND OF THE INVENTION

1. Field of the Invention

The invention disclosed and claimed herein generally pertains to a method and related apparatus for data transfer between multiple root nodes and PCI adapters, through an input/output (I/O) switched-fabric bus. More particularly, the invention pertains to a method of the above type wherein different root nodes may be routed through the I/O fabric to share the same adapter, and a single control, used to configure the routing for all root nodes, resides in one of the nodes. Even more particularly, the invention pertains to a method of the above type wherein a challenge procedure is provided, to resolve any uncertainty as to which node is serving as the control node.

2. Description of the Related Art

As is well known by those of skill in the art, PCI Express (PCI-E) is widely used in computer systems to interconnect host units to adapters or other components, by means of an I/O switched-fabric bus or the like. However, PCI-E currently does not permit sharing of PCI adapters in topologies where there are multiple hosts with multiple shared PCI buses. As a result, even though such sharing capability could be very valuable when using blade clusters or other clustered servers, adapters for PCI-E and secondary networks (e.g., FC, IB, Enet) are at present generally integrated into individual blades and server systems. Thus, such adapters cannot be shared between clustered blades, or even between multiple roots within a clustered system.

In an environment containing multiple blades or blade clusters, it can be very costly to dedicate a PCI adapter for use with only a single blade. For example, a 10 Gigabit Ethernet (10 GigE) adapter currently costs on the order of $6,000. The inability to share these expensive adapters between blades has, in fact, contributed to the slow adoption rate of certain new network technologies such as 10 GigE. Moreover, there is a constraint imposed by the limited space available in blades to accommodate PCI adapters. This problem of limited space could be overcome if a PC network was able to support attachment of multiple hosts to a single PCI adapter, so that virtual PCI I/O adapters could be shared between the multiple hosts.

In a distributed computer system comprising a multi-host environment or the like, the configuration of any portion of an I/O fabric that is shared between hosts, or other root nodes, cannot be controlled by multiple hosts. This is because one host might make changes that affect another host. Accordingly, to achieve the above goal of sharing a PCI adapter amongst different hosts, it is necessary to provide a central management mechanism of some type. This management mechanism is needed to configure the routings used by PCI switches of the I/O fabric, as well as by the root complexes, PCI adapters and other devices interconnected by the PCI switches.

It is to be understood that the term "root node" is used herein to generically describe an entity that may comprise a computer host CPU set or the like, and a root complex connected thereto. The host set could have one or multiple discrete CPU's. However, the term "root node" is not necessarily limited to host CPU sets. The term "root complex" is used herein to generically describe structure in a root node for connecting the root node and its host CPU set to the I/O fabric.

In one very useful approach, a particular designated root node includes a component which is the PCI Configuration Master (PCM) for the entire multi-host system. The PCM configures all routings through the I/O fabric, for all PCI switches, root complexes and adapters. However, in a PCI switched-fabric, multiple fabric managers are allowed. Moreover, any fabric manager can plug into any root switch port, that is, the port of a PCI switch that is directly connected to a root complex. As a result, when a PCM of the above type is engaged in configuring a route through a PCI fabric, it will sometimes encounter a switch that appears to be controlled by a fabric manager other than the PCM, residing at a root node other than the designated node. Accordingly, it is necessary to provide a challenge procedure, to determine or affirm which root node actually contains the controlling fabric configuration manager.

SUMMARY OF THE INVENTION

The invention generally provides a challenge procedure or protocol for determining the root node in which the PCI Configuration Master or Manager actually resides, in a multi-host system of the above type. This node is referred to as the master node. The challenge procedure is activated whenever the identity of the PCM, determined by the root node containing the PCM, appears to be uncertain. The challenge procedure resolves this uncertainty, and enables the PCM to continue to configure routings throughout the system. In one useful embodiment, the invention is directed to a method for a distributed computer system provided with multiple root nodes, and further provided with one or more PCI switches and with adapters or other components that are available for sharing by different nodes. The method includes the steps of selecting a first one of the root nodes to be the master root node for the system, and operating the first root node to implement a procedure whereby the first root node queries the configuration space of a particular one of the PCI switches. The method further includes detecting information indicating that a second root node, rather than the first root node, is considered to be the master root node for the particular switch. A challenge procedure is implemented in response to this detected information, in an effort to confirm that the first root node is in fact the master root node for the system. The configuration space querying procedure is then continued, if the first root node is confirmed to be the master root node. Otherwise, the querying procedure is aborted so that corrective action can be taken. Usefully, when the PCM is performing PCI configuration, all the root nodes are in a quiescent state. After the switched-fabric has been configured, the PCM writes the configuration information into the root switches, and then enables each of the root ports to access its configuration.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
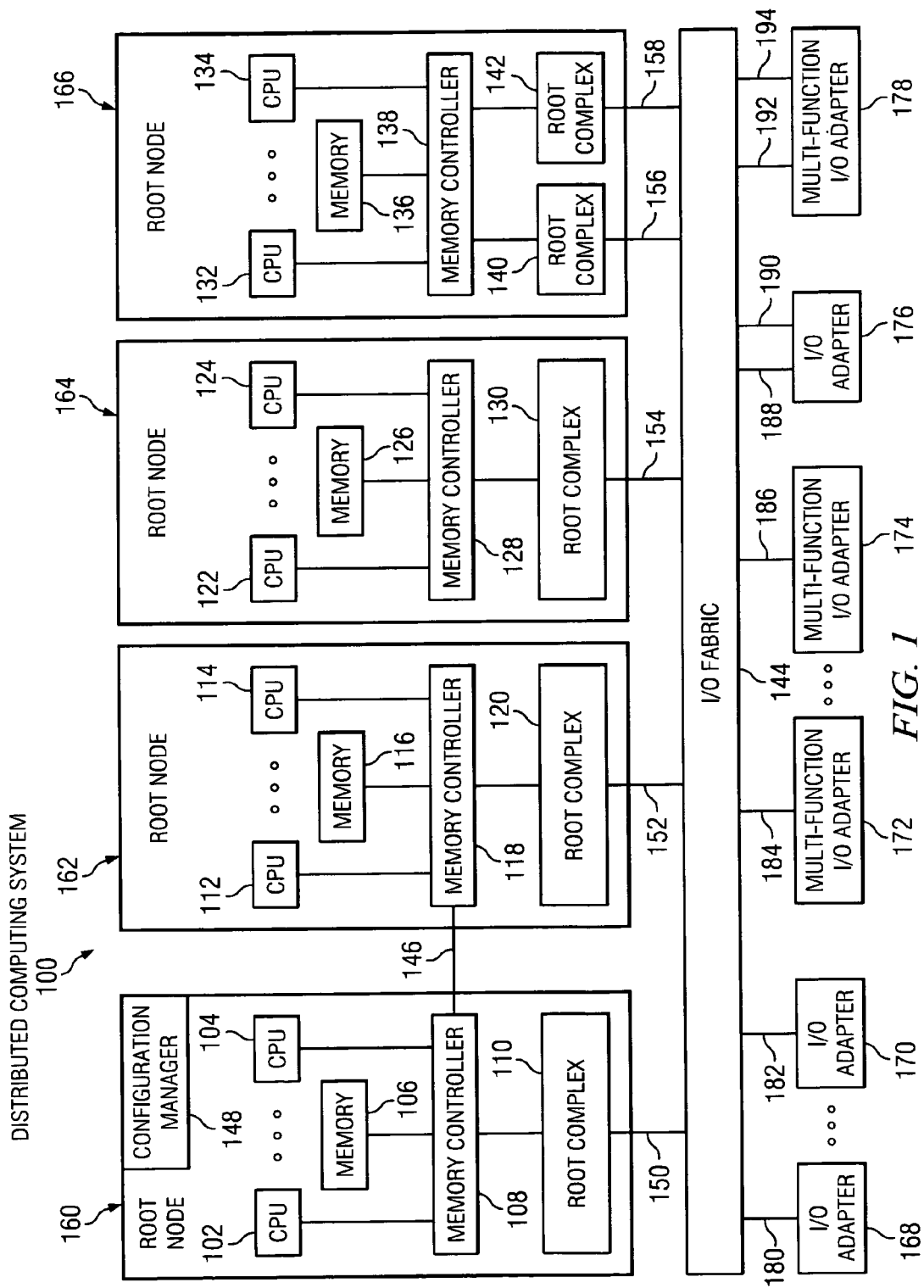
FIG. 1 is a block diagram showing a generic distributed computer system in which an embodiment of the invention may be implemented.

FIG. 1 shows a distributed computer system 100 in which a preferred embodiment of the present invention may be practiced. The distributed computer system 100 takes the form of multiple root complexes (RCs) 110, 120, 130, 140 and 142, respectively connected to an I/O fabric 144 through I/O links 150, 152, 154, 156 and 158, and to the memory controllers 108, 118, 128 and 138 of the root nodes (RNs) 160-166. The I/O fabric is attached to I/O adapters (IOAs) 168-178 through links 180-194. The IOAs may be single function, such as IOAs 168-170 and 176, or multiple function, such as IOAs 172-174 and 178. Moreover, respective IOAs may be connected to the I/O fabric 144 via single links, such as links 180-186, or with multiple links for redundancy, such as links 188-194.

The RCs 110, 120, and 130 are integral components of RN 160, 162 and 164, respectively. There may be more than one RC in an RN, such as RCs 140 and 142 which are both integral components of RN 166. In addition to the RCs, each RN consists of one or more Central Processing Units (CPUs) 102-104, 112-114, 122-124 and 132-134, memories 106, 116, 126 and 128, and memory controllers 108, 118, 128 and 138. The memory controllers respectively interconnect the CPUs, memory, and I/O RCs of their corresponding RNs, and perform such functions as handling the coherency traffic for respective memories.

RN's may be connected together at their memory controllers, such as by a link 146 extending between memory controllers 108 and 118 of RNs 160 and 162. This forms one coherency domain which may act as a single Symmetric Multi-Processing (SMP) system. Alternatively, nodes may be independent from one another with separate coherency domains as in RNs 164 and 166.

FIG. 1 further shows a PCI Configuration Manager (PCM) 148 incorporated into one of the RNs, such as RN 160, as an integral component thereof. The PCM configures the shared resources of the I/O fabric and assigns resources to the RNs.

It is to be understood that any one of the root nodes 160-166 could support the PCM. However, there must be only one PCM, to configure all routes and assign all resources, throughout the entire system 100. Clearly, significant uncertainties could develop if it appeared that there was more than one PCM in system 100, with each PCM residing in a different root node. Accordingly, embodiments of the invention are provided, first to determine that an uncertain condition regarding the PCM exists, and to then resolve the uncertainty.

In a very useful embodiment, a challenge protocol is operable to recognize that a PCI switch, included in the switched-fabric of the system, appears to be under the control of a PCM that is different from the PCM currently in control of the system. Upon recognizing this condition, the challenge protocol will either confirm that the current PCM has control over the switch, or else will abort configuration of the switch. This challenge protocol or procedure is described hereinafter in further detail, in connection with FIGS. 7 and 8.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
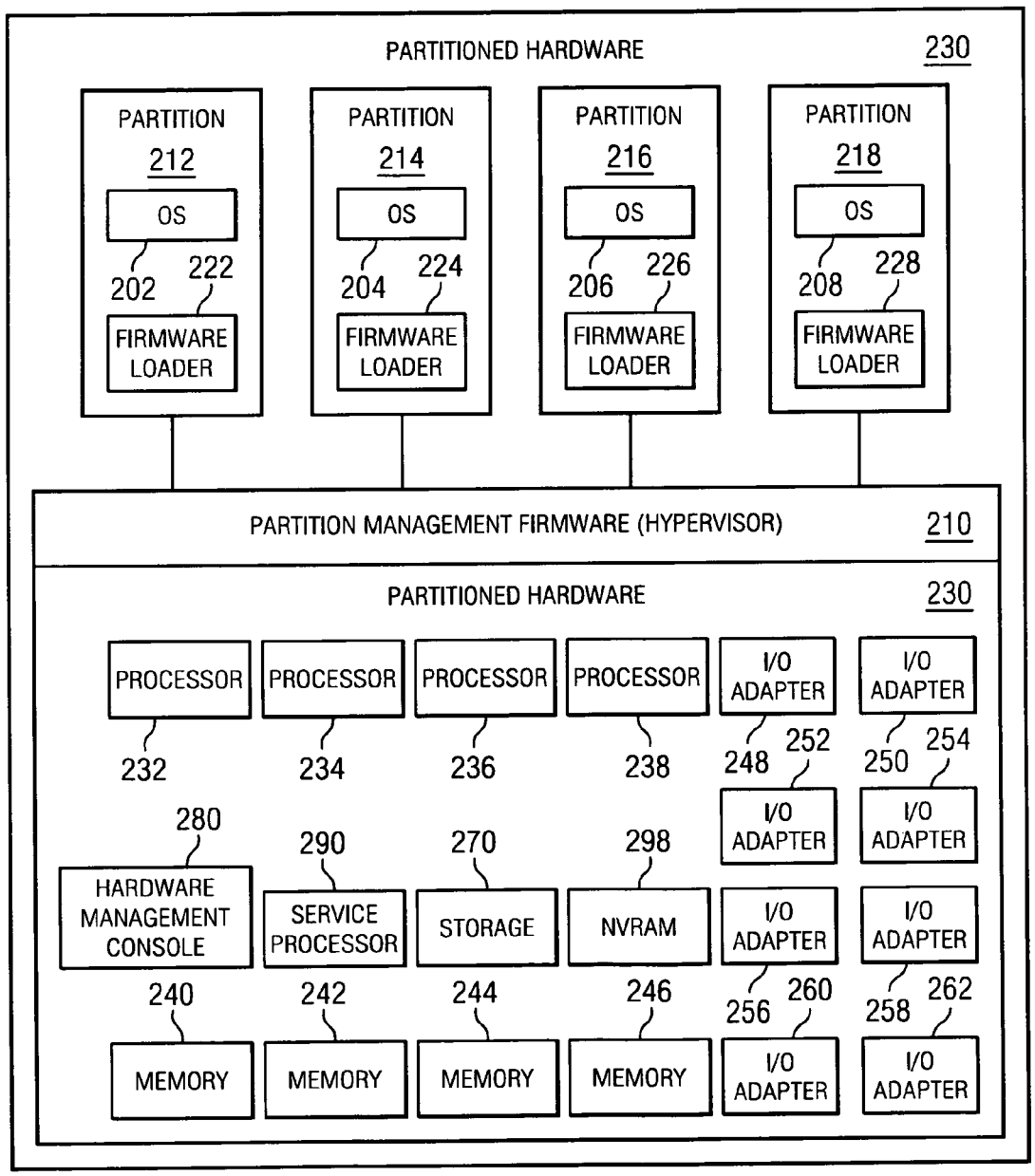
FIG. 2 is a block diagram showing an exemplary logical partitioned platform in the system of FIG. 1.

With reference to FIG. 2, a block diagram of an exemplary logical partitioned platform 200 is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208 and hypervisor 210. Operating systems 202, 204, 206 and 208 may be multiple copies of a single operating system, or may be multiple heterogeneous operating systems simultaneously run on platform 200. These operating systems may be implemented using OS/400, which is designed to interface with a hypervisor. Operating systems 202, 204, 206 and 208 are located in partitions 212, 214, 216 and 218, respectively. Additionally, these partitions respectively include firmware loaders 222, 224, 226 and 228. When partitions 212, 214, 216 and 218 are instantiated, a copy of open firmware is loaded into each partition by the hypervisor's partition manager. The processors associated or assigned to the partitions are then dispatched to the partitions' memory to execute the partition firmware.

Partitioned hardware 230 includes a plurality of processors 232-238, a plurality of system memory units 240-246, a plurality of input/output (I/O) adapters 248-262, and a storage unit 270. Partition hardware 230 also includes service processor 290, which may be used to provide various services, such as processing of errors in the partitions. Each of the processors 232-238, memory units 240-246, NVRAM 298, and I/O adapters 248-262 may be assigned to one of multiple partitions within logically partitioned platform 200, each of which corresponds to one of operating systems 202, 204, 206 and 208.

Partition management firmware (hypervisor) 210 performs a number of functions and services for partitions 212, 214, 216 and 218 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), electrically erasable programmable ROM (EEPROM), and non-volatile random access memory (NVRAM). Thus, hypervisor 210 allows the simultaneous execution of independent OS images 202, 204, 206 and 208 by virtualizing all the hardware resources of logically partitioned platform 200.

Operation of the different partitions may be controlled through a hardware management console, such as hardware management console 280. Hardware management console 280 is a separate distributed computing system from which a system administrator may perform various functions including reallocation of resources to different partitions.

In an environment of the type shown in FIG. 2, it is not permissible for resources or programs in one partition to affect operations in another partition. Moreover, to be useful, the assignment of resources needs to be fine-grained. For example, it is often not acceptable to assign all IOAs under a particular PHB to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
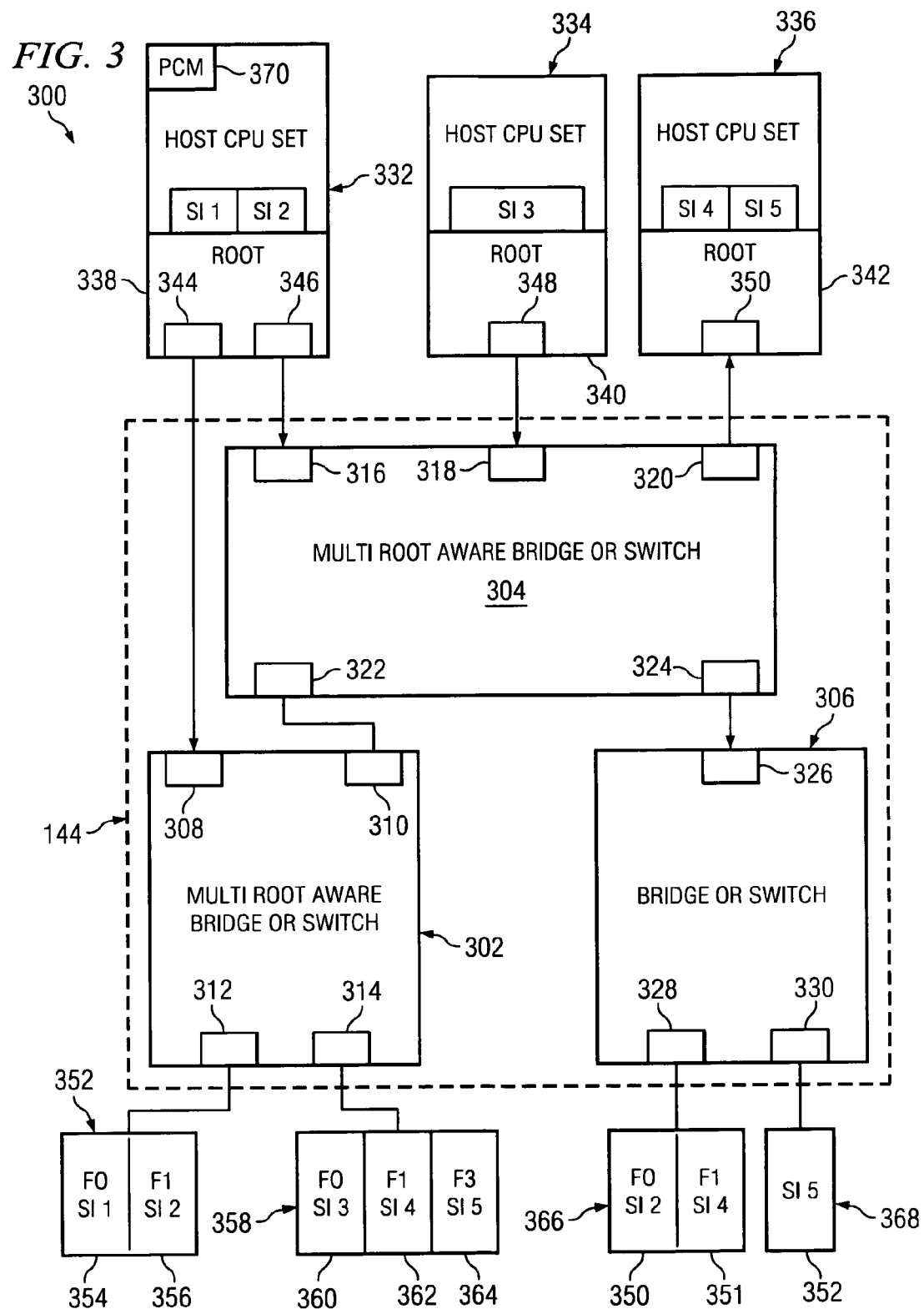
FIG. 3 is a block diagram showing a distributed computer system provided with multiple hosts and respective PCI family components that are collectively operable in accordance with an embodiment of the invention.

Referring to FIG. 3, there is shown a distributed computer system 300 that includes a more detailed representation of the I/O switched-fabric 144 depicted in FIG. 1. More particularly, to further illustrate the concept of a PCI family fabric that supports multiple root nodes through the use of multiple switches, fabric 144 is shown in FIG. 3 to comprise a plurality of PCIe switches (or PCI family bridges) 302, 304 and 306. FIG. 3 further shows switches 302, 304 and 306 provided with ports 308-314, 316-324 and 326-330, respectively. The switches 302 and 304 are referred to as multi-root aware switches, for reasons described hereinafter. It is to be understood that the term "switch", when used herein by itself, may include both switches and bridges. The term "bridge" as used herein generally pertains to a device for connecting two segments of a network that use the same protocol.

Referring further to FIG. 3, there are shown host CPU sets 332, 334 and 336, each containing a single or a plurality of system images (SIs). Thus, host 332 contains system image SI 1 and SI 2, host 334 contains system image SI 3, and host 336 contains system images SI 4 and SI 5. It is to be understood that each system image is equivalent or corresponds to a partition, as described above in connection with FIG. 2. Each of the host CPU sets has an associated root complex as described above, through which the system images of respective hosts interface with or access the I/O fabric 144. More particularly, host sets 332-336 are interconnected to RCs 338-342, respectively. Root complex 338 has ports 344 and 346, and root complexes 340 and 342 each has only a single port, i.e. ports 348 and 350, respectively. Each of the host CPU sets, together with its corresponding root complex, comprises an example or instance of a root node, such as RNs 160-166 shown in FIG. 1. Moreover, host CPU set 332 is provided with a PCM 370 that is similar or identical to the PCM 148 of FIG. 1.

FIG. 3 further shows each of the RCs 338-342 connected to one of the ports 316-320, which respectively comprise ports of multi-root aware switch 304. Each of the multi-root aware switches 304 and 302 provides the capability to configure a PCI family fabric such as I/O fabric 144 with multiple routings or data paths, in order to accommodate multiple root nodes.

Respective ports of a multi-root aware switch, such as switches 302 and 304, can be used as upstream ports, downstream ports, or both upstream and downstream ports. Generally, upstream ports are closer to the RC. Downstream ports are further from RC. Upstream/downstream ports can have characteristics of both upstream and downstream ports. In FIG. 3 ports 316, 318, 320, 326 and 308 are upstream ports. Ports 324, 312, 314, 328 and 330 are downstream ports, and ports 322 and 310 are upstream/downstream ports.

The ports configured as downstream ports are to be attached or connected to adapters or to the upstream port of another switch. In FIG. 3, multi-root aware switch 302 uses downstream port 312 to connect to an I/O adapter 352, which has two virtual I/O adapters or resources 354 and 356. Similarly, multi-root aware switch 302 uses downstream port 314 to connect to an I/O adapter 358, which has three virtual I/O adapters or resources 360, 362 and 364. Multi-root aware switch 304 uses downstream port 324 to connect to port 326 of switch 306. Multi-root aware switch 304 uses downstream ports 328 and 330 to connect to I/O adapter 366, which has two virtual I/O adapters or resources 353 and 351, and to I/O adapter 368, respectively.

Each of the ports configured as an upstream port is used to connect to one of the root complexes 338-342. Thus, FIG. 3 shows multi-root aware switch 302 using upstream port 308 to connect to port 344 of RC 338. Similarly, multi-root aware switch 304 uses upstream ports 316, 318 and 320 to respectively connect to port 346 of root complex 338, to the single port 348 of RC 340, and to the single port 350 of RC 342.

The ports configured as upstream/downstream ports are used to connect to the upstream/downstream port of another switch. Thus, FIG. 3 shows multi-root aware switch 302 using upstream/downstream port 310 to connect to upstream/downstream port 322 of multi-root aware switch 304.

I/O adapter 352 is shown as a virtualized I/O adapter, having its function 0 (F0) assigned and accessible to the system image SI 1, and its function 1 (F1) assigned and accessible to the system image SI 2. Similarly, I/O adapter 358 is shown as a virtualized I/O adapter, having its function 0 (F0) assigned and assessible to SI 3, its function 1 (F1) assigned and accessible to SI 4 and its function 3 (F3) assigned to SI 5. I/O adapter 366 is shown as a virtualized I/O adapter with its function F0 assigned and accessible to SI 2 and its function F1 assigned and accessible to SI 4. I/O adapter 368 is shown as a single function I/O adapter assigned and accessible to SI 5.

Figure 4:
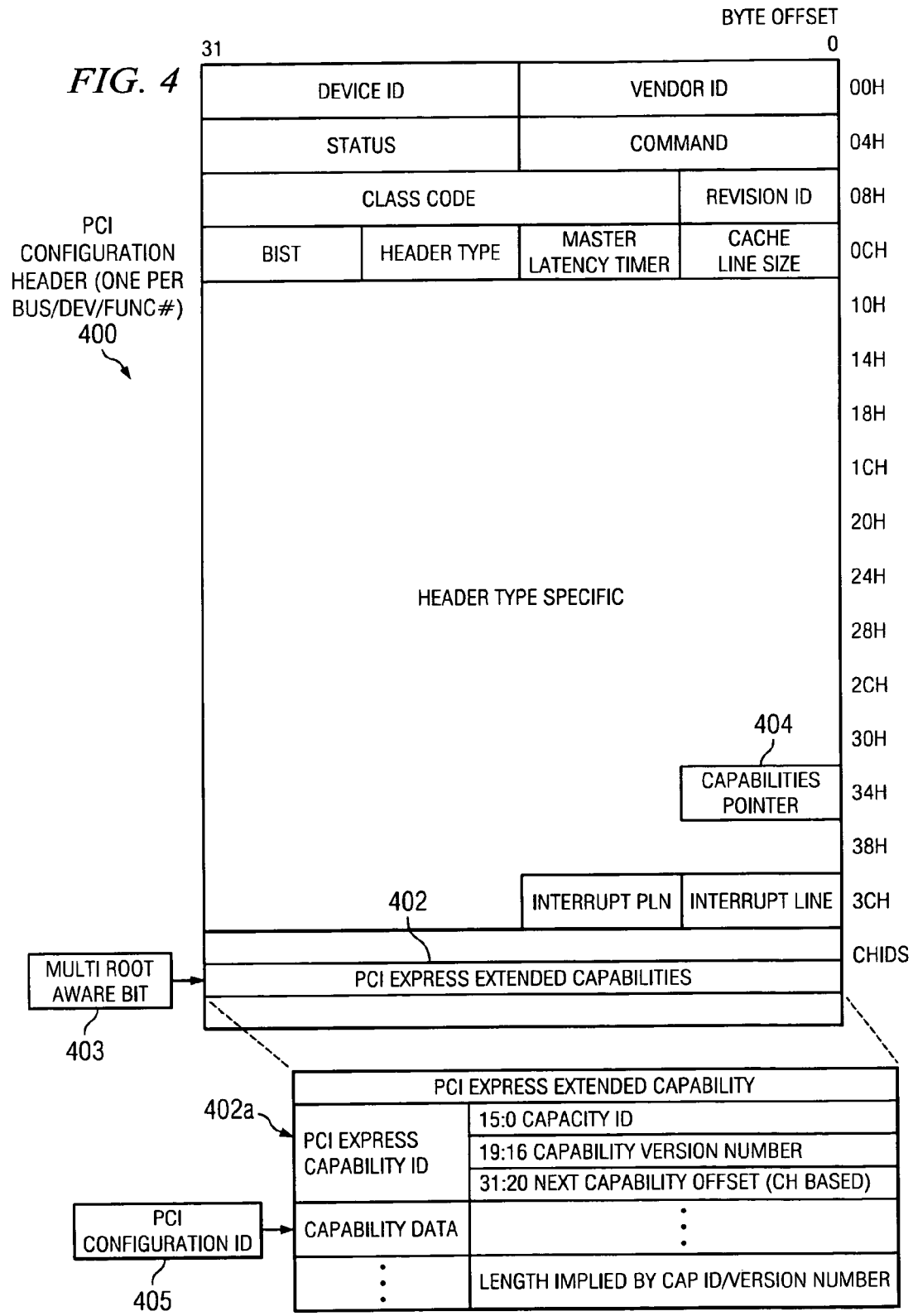
FIG. 4 is a schematic diagram depicting a PCI configuration space adapted for use with an embodiment of the invention.

Referring to FIG. 4, there is shown a PCI configuration space for use with distributed computer system 300 or the like, in accordance with an embodiment of the invention. As is well known, each switch, bridge and adapter in a system such as data processing system 300 is identified by a Business/Device/Function (BDF) number. The configuration space is provided with a PCI configuration header 400, for each BDF number, and is further provided with an extended capabilities area 402. Respective information fields that may be included in extended capabilities area 402 are shown in FIG. 4, at 402a. These include, for example, capability ID, capability version number and capability data. In addition, new capabilities may be added to the extended capabilities 402. PCI-Express generally uses a capabilities pointer 404 in the PCI configuration header 400 to point to new capabilities. PCI-Express starts its extended capabilities 402 at a fixed address in the PCI configuration header 400.

In accordance with the invention, it has been recognized that the extended capabilities area 402 can be used to determine whether or not a PCI component is a multi-root aware PCI component. More particularly, the PCI-Express capabilities 402 is provided with a multi-root aware bit 403. If the extended capabilities area 402 has a multi-root aware bit 403 set for a PCI component, then the PCI component will support the multi-root PCI configuration as described herein. Moreover, FIG. 4 shows the extended capabilities area 402 provided with a PCI Configuration Manager (PCM) identification (ID) field 405. If a PCI component supports the multi-root PCI configuration mechanism, then it will also support PCM ID field 405.

It is to be understood that the PCM ID is a value that uniquely identifies the PCM, throughout a distributed computer system such as system 100 or 300. More particularly, the PCM ID clearly indicates the root node or CPU set in which the PCM component is located.

Figures 5, 6:
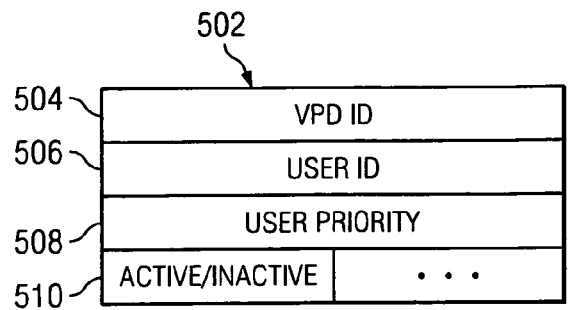
FIG. 5 is a schematic diagram showing an information space for each of the host sets of the system of FIG. 3.
FIG. 6 is a schematic diagram showing components of a fabric table constructed by the PCM to provide a record of routings that have been configured or set up.

Referring to FIG. 5, there is shown an information space 502, one of which corresponds to each root node or host CPU set. Each information space 502 includes a number of information fields such as fields 504-508, which provide the vital product data (VPD) ID, the user ID and the user priority, respectively, for its corresponding root node or host CPU set. It is to be understood that other information fields not shown could also be included in each information space 502. User ID and user priority may be assigned to respective root nodes by a system user, administrator or administration agent.

As is known by those of skill in the art, a unique VPD ID is assigned to a host CPU set when the unit is manufactured. Thus, respective host CPU sets of system 300 will have VPD ID values that are different from one another. It follows that to provide a unique value for PCM ID, the host CPU set having the highest VPD ID value could initially be selected to contain the PCM, and the PCM ID would be set to such highest VPD ID value. Alternatively, the host CPU set having the highest user ID, the highest user priority, or the highest value of a parameter not shown in information space 502 could be initially selected to contain the PCM component, and the PCM ID would be such highest value. The root node or host CPU unit initially designated to contain the PCM, and to thereby be the master root node for the system, could be selected by a system user, or could alternatively be selected automatically by a program.

Referring further to FIG. 5, there is shown information space 502 having an active/interactive (A/I) field 510. The root node at which the PCM is located shows an active status in its field 510, and the remaining root nodes of the system each show an inactive status. As an example, host CPU set 332 of system 300 would have an active status in field 510, since it contains PCM 370, and host sets 334 and 336 would each have an inactive status.

An important function of the PCM 370, after respective routings have been configured, is to determine the state of each switch in the distributed processing system 300. This is usefully accomplished by operating the PCM to query the PCI configuration space, described in FIG. 4, that pertains to each component of the system 300. This operation is carried out to provide system configuration information, while each of the other host sets remains inactive or quiescent. The configuration information indicates the interconnections of respective ports of the system to one another, and can thus be used to show the data paths, or routings, through the PCI switches of switched-fabric 144.

Referring to FIG. 6, there is shown a fabric table 602, which is constructed by the PCM as it acquires configuration information. The configuration information is usefully acquired by querying portions of the PCI-E configuration space respectively attached to a succession of active ports (AP), as described hereinafter in connection with FIG. 7.

Referring further to FIG. 6, there is shown fabric table 602 including an information space 604 that shows the state of a particular switch in distributed system 300. Information space 604 includes a field 606, containing the identity of the current PCM, and a field 608 that indicates the total number of ports the switch has. For each port, field 610 indicates whether the port is active or inactive, and field 612 indicates whether a tree associated with the port has been initialized. Field 614 shows whether the port is connected to a root complex (RC), to a bridge or switch (S) or to an end point (EP).

FIG. 6 further shows fabric table 602 including additional information spaces 616 and 618, which respectively pertain to other switches or PCI components. While not shown, fabric table 602 in its entirety includes an information space similar to space 604 for each component of system 300. Fabric table 602 can be implemented as one table containing an information space for all the switches and PCI components in the fabric, or as a linked list of tables, where each table contains the information space for a single PCI switch or PCI component.

In systems such as those of FIGS. 1 and 3, multiple fabric managers are allowed, and can plug into any part of a multi-root aware switch such as switches 302 and 304. As a result, and as discussed above, when the current PCM is acquiring PCM identity information from the field 606 of a particular switch, it may happen that a PCM ID associated with the switch is different from the identity of the current PCM. In order to construct a fabric table, the invention provides a challenge protocol to deal with events of this type.

Figure 7:
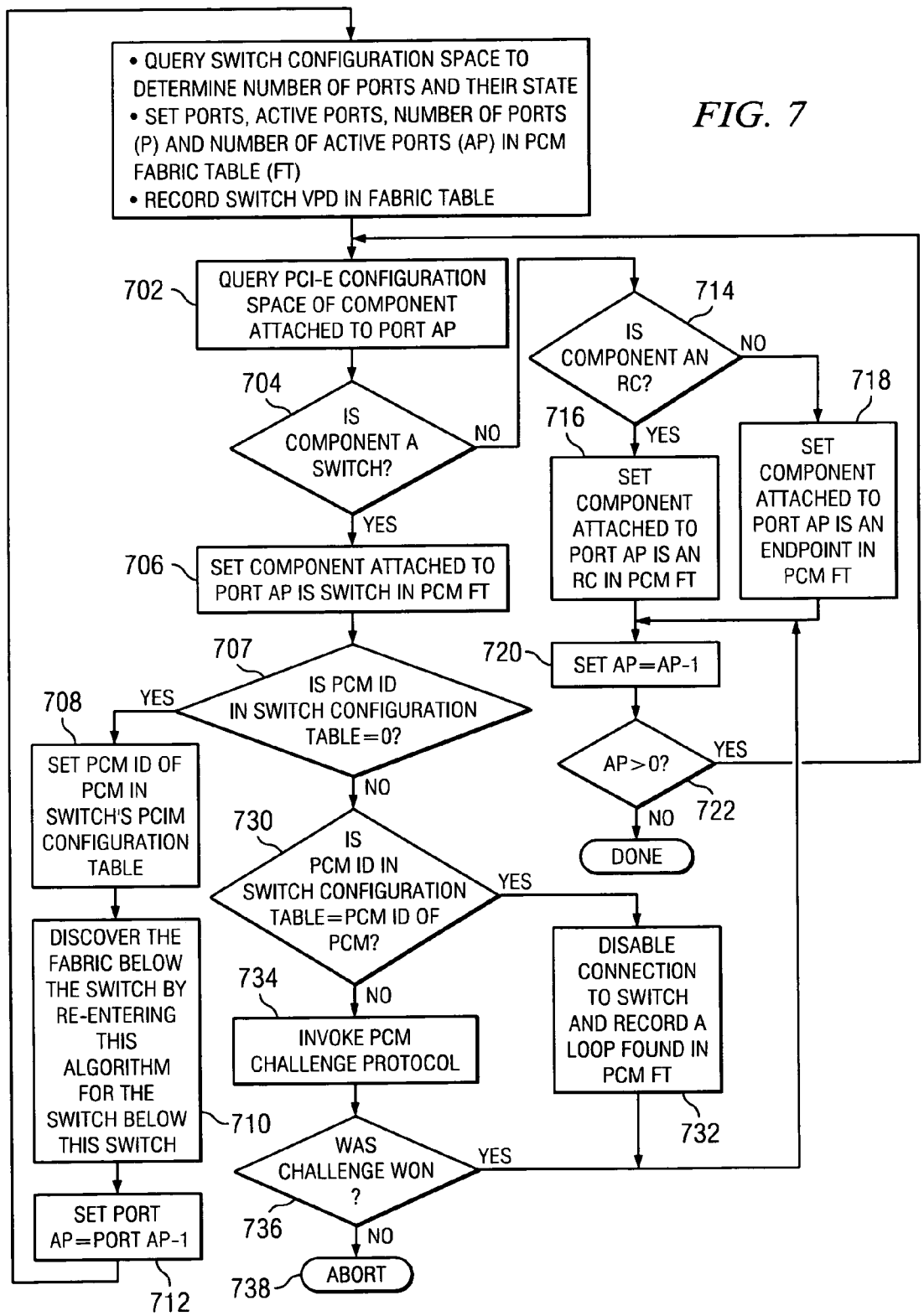
FIG. 7 is a flow chart depicting steps carried out by the PCM in constructing the table of FIG. 6, including steps for an embodiment of the invention.

Referring to FIG. 7, there is shown a procedure usefully carried out by the PCM, in order to construct the fabric table 602. Generally, the PCM successively queries the PCI configuration space of each switch and other PCI component. This is done to determine the number of ports a component has and whether respective ports are active ports (AP) or inactive ports. The PCM then records this information in the fabric table, together with the VPD ID of the PCI component.

Function block 702 and decision block 704 indicate that the procedure of FIG. 7 begins by querying the configuration space to find out if the component attached to a port AP is a switch. Function block 706 shows that if the component is a switch, the field "Component attached to port (AP) is a switch" is set in the PCM fabric table. Then, in accordance with decision block 707, it becomes necessary to determine whether the switch being queried already shows a PCM ID, either the identity of the currently active PCM or a different PCM. More specifically, decision block 707 requires determining whether field 606 of the switch does or does not show a PCM ID that is equal to 0.

FIG. 7 further shows that if the determination of decision block 707 is positive, the ID of the current PCM, which is engaged in constructing the fabric table, is set in the PCM configuration table of the switch, in accordance with function block 708. This table is the information space in fabric table 602 that pertains to the switch. Function block 710 shows that the fabric below the switch is then discovered, by re-entering this algorithm for the switch below the switch of port AP in the configuration. Function block 712 discloses that the port AP is then set to port AP-1, the next following port, and the step indicated by function block 702 is repeated.

Referring again to decision block 707 of FIG. 7, it is seen that if the determination of block 707 is negative, the switch being queried must contain a non-zero value for PCM ID. Accordingly, as shown by decision block 730, it becomes necessary to determine whether or not this PCM ID value is equal to the current PCM ID, that is, the PCM in control of the system. If such determination is positive, function block 732 indicates that the PCM disables the port connection to the switch, and records in the fabric table that a loop was found.

The task set forth at function block 720, which is described hereinafter in further detail, is then carried out.

Referring further to decision block 730 of FIG. 7, a negative result for the query thereof would indicate that the switch had a PCM ID that was different from the current PCM ID. In this event, it becomes necessary to invoke the PCM challenge protocol, as shown by function block 734. This protocol is described hereinafter, in connection with FIG. 8, and either will or will not be won by the current PCM ID, in accordance with decision block 736. If the challenge is won, the procedure of FIG. 7 is again advanced to function block 720. If the challenge is lost, the procedure is aborted, as shown by function block 738.

Referring further to decision block 704 of FIG. 7, if the component being queried is not a switch, it becomes necessary to determine if the component is a root complex or not, as shown by decision block 714. If this query is positive, the message "Component attached to port AP is an RC" is set in the PCM fabric table, as shown by function block 716. Otherwise, the message "Component attached to port AP is an end point" is set in the PCM fabric table, as shown by function block 718. In either event, the port AP is thereupon set to AP-1, as shown by function block 720. It then becomes necessary to determine if the new port AP value is greater than zero, in accordance with decision block 722. If it is, the step of function block 702 is repeated for the new port AP. If not, the process of FIG. 7 is brought to an end.

When the fabric table 602 is completed, the PCM writes the configured routing information that pertains to a given one of the host CPU sets into the root complex of the given host set. This enables the given host set to access each PCI adapter assigned to it by the PCM, as indicated by the received routing information. However, the given host set does not receive configured routing information for any of the other host CPU sets. Accordingly, the given host is enabled to access only the PCI adapters assigned to it by the PCM.

Usefully, the configured routing information written into the root complex of a given host comprises a subset of a tree representing the physical components of distributed computing system 300. The subset indicates only the PCI switches, adapters and bridges that can be accessed by the given host CPU set.

As a further feature, only the host CPU set containing the PCM is able to issue write operations, or writes. The remaining host CPU sets are respectively modified, to either prevent them from issuing writes entirely, or requiring them to use the PCM host set as a proxy for writes.

Figure 8:
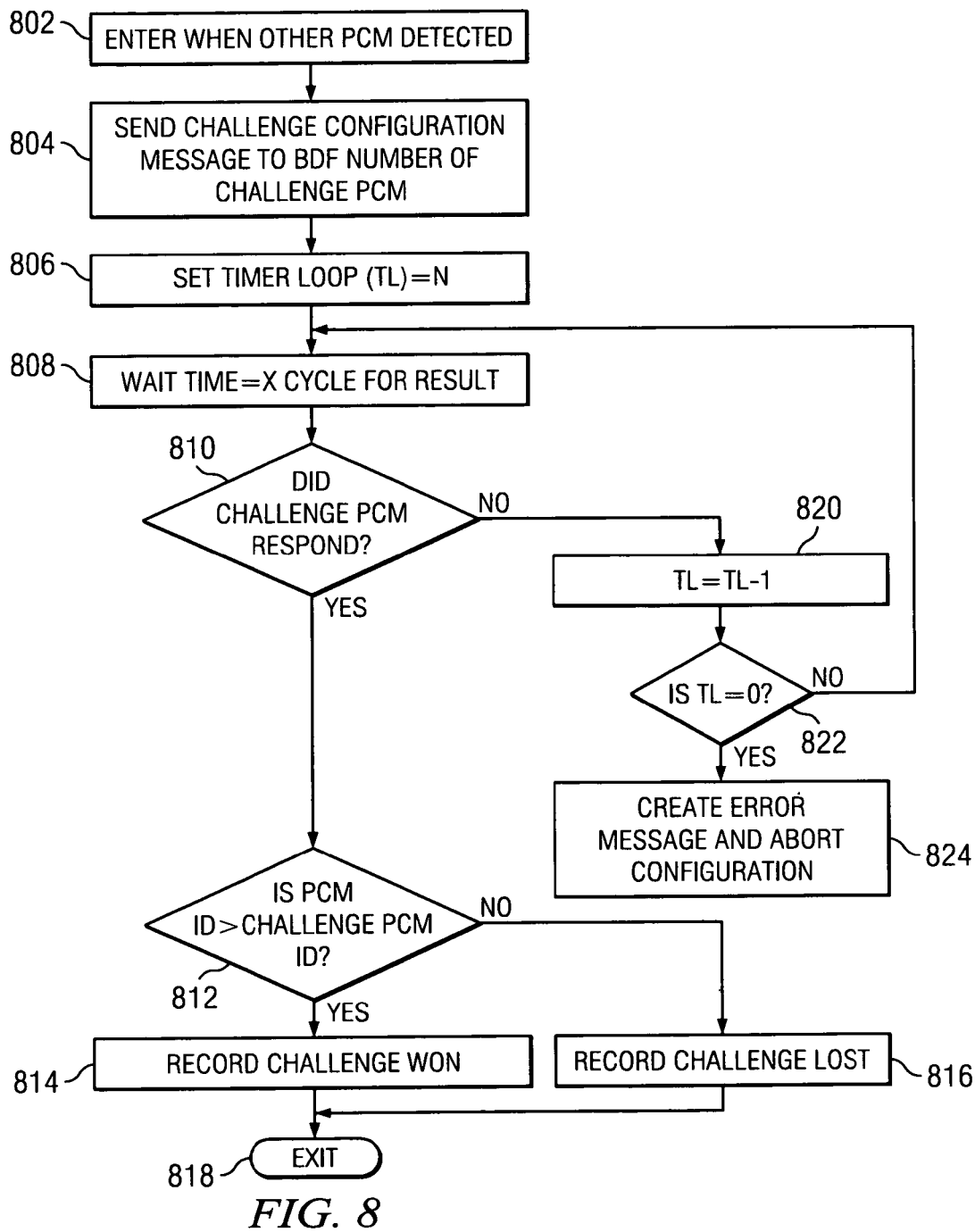
FIG. 8 is a flow chart depicting a challenge protocol in accordance with the embodiment of FIG. 7.

Referring to FIG. 8, there is shown a flow chart depicting a challenge protocol for an embodiment of the invention. Function block 802 indicates that the protocol is entered when a PCI switch is found to show a PCM ID that is not the current PCM ID, as described above in connection with function block 734 of FIG. 7. Upon entering the protocol, a message challenging the switch configuration is sent to the root node identified by the PCM found at the switch, referred to hereinafter as the challenge PCM. As shown by function block 804, the challenge message is directed to the BDF number of the identified root node. After the message is sent, function block 806 indicates that a timer loop (TL) is set to an integer N associated with a time period. N could, for example, be 5 and the time period could be 5 milliseconds. Function block 806 shows that a corresponding cycle time X is also selected. If the cycle time was selected to be 1 millisecond, 5 cycles or iterations would occur until the time period associated with N came to an end. As described hereinafter, the values pertaining to function blocks 806 and 808 are respectively selected to establish a maximum period for response.

Referring further to FIG. 8, decision blocks 810 and 812 indicate that the challenge PCM may respond to the challenge message, sent to the identified root node, by providing its challenge PCM ID. If such response is received by the current PCM, the challenge PCM ID is compared with the current PCM ID, as shown by decision block 812. If the current PCM ID is found to be greater than the challenge PCM ID, confirmation is provided that the current PCM is indeed the correct PCM. Accordingly, the challenge is recorded to be won, as shown by function block 814, and the protocol is exited at 818. Thereupon, the procedure shown in FIG. 7 is advanced to function block 720 thereof.

In the event that the challenge PCM ID is found to be equal to or greater than the current PCM ID, the challenge will be recorded as being lost, as indicated by function block 816. The protocol will be exited and the procedure of FIG. 7 will be aborted, in accordance with function block 738.

Referring further to decision block 810 of FIG. 8, if the challenge PCM does not respond to the challenge message within the cycle time, the timer loop TL is decremented by one, as shown by function block 820. For a TL of 5, TL-1 would go to 4. If TL was not 0, the protocol would return to function block 808, in accordance with decision block 822. The protocol would then wait for another period of cycle time X for the challenge PCM to respond to the message. After a number of such iterations with no response, TL will reach 0. When this occurs, an error message is created and the configuration pertaining to the switch is aborted, as shown by function block 824.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The computer program code may be accessible from a computer-usable or computer-readable storage medium for use by or in connection with a computer or any instruction execution system. For the purposes of this description, a computer-usable or computer readable medium can be any tangible apparatus that can contain and store the program for use by or in connection with the instruction execution system, apparatus, or device.

The medium can be an electronic, magnetic, optical, electromagnetic, infrared, or a semiconductor system. The medium also may be physical medium or tangible medium on which computer readable program code can be stored. Examples of a computer-readable medium include a semiconductor or solid state memory, magnetic tape, a removable computer diskette, a random access memory (RAM), a read-only memory (ROM), a rigid magnetic disk, an optical disk, or some other physical storage device configured to hold computer readable program code. Current examples of optical disks include compact disk-read only memory (CD-ROM), compact disk-read/write (CD-R/W) and DVD.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a distributed computer system provided with multiple root nodes, each root node comprising a host CPU set, that share a number of PCI adapters through an input/output (I/O) fabric comprising a number of PCI buses and switches, a method comprising the steps of:

selecting one of said root nodes to be master root node for said system, wherein the root nodes share a number of PCI buses, and wherein the master root node has a PCI configuration manager (PCM) component;

operating the PCM component in the selected root node to implement a procedure whereby the selected root node iteratively queries a configuration space of each of said PCI switches, wherein the PCM component configures all routings through the I/O fabric for the PCI switches by setting the configuration space for each of the PCI switches;

detecting whether a particular PCI switch has been configured by another PCM component in a different root node;

responsive to detecting that the particular PCI switch has been configured by the other PCM component in the different root node, implementing a challenge procedure to confirm whether the selected root node is the master root node, wherein the configuration space of the particular PCI switch is set by the PCM component of the selected root node if the selected root node is confirmed to be the master root node;

continuing said configuration space querying procedure, if the selected root node is confirmed to be the master root node by said challenge procedure;

aborting the configuration space querying procedure if the selected root node is not confirmed to be the master root node by the challenge procedure; and responsive to detecting that the particular PCI switch has not been configured by the other PCM component in the different root node, setting the configuration space for the particular PCI switch by the PCM component of the selected root node.

2. The method of claim 1, wherein:
the challenge procedure comprises determining whether the selected root node meets a pre-selected criterion.

3. The method of claim 2, wherein:
the criterion is derived from a comparison of values in a selected value field, wherein the value field is selected from a group of value fields that includes at least vital product data identification, user identification, and user priority for each of said root nodes.

4. The method of claim 1, wherein:
detecting whether a particular PCI switch has been configured by another PCM component in the different root node comprises receiving a detected information having a data table entry indicating that the different root node is considered to be the master root node for the particular PCI switch.

5. The method of claim 1, wherein:
the configuration space querying procedure is suspended while the challenge procedure is being carried out.

6. The method of claim 1, wherein:
implementation of the challenge procedure requires a response within a specified time period, and the configuration querying procedure is aborted if the required response does not occur within the specified time period.

7. The method of claim 1, wherein:
the selected root node is initially designated to be the master root node for the system, either by a system user or automatically by a program, selectively.

8. The method of claim 1, wherein:
the selected root node, upon being confirmed to be the master root node, is operated to configure routings through each of the PCI switches, each of the configured routings corresponding only to one of the root nodes, and each routing providing a path for data traffic between its corresponding root node and one of the adapters, the routings being configured by the selected root node during a time when the remaining root nodes are respectively in a quiescent state.

9. The method of claim 8, wherein:
the selected root node furnishes a particular root node with configured routing information that comprises a subset of a tree representing physical components of the distributed computing system, wherein the subset indicates only PCI switches, adapters and bridges that can be accessed by the particular root node.

10. In a distributed computer system provided with multiple root nodes, each root node comprising a host CPU set, that share a number of PCI adapters through an input/output (I/O) fabric comprising a number of PCI buses and switches, a computer program product in a computer readable storage medium comprising:

first instructions for selecting a one of the root nodes to be master root node for the system, wherein the root nodes share a number of PCI buses, and wherein the master root node has a PCI configuration manager (PCM) component, the first instructions being executed by a processor;

second instructions for operating the PCM component in the selected root node to implement a procedure whereby the selected root node iteratively queries a configuration space of each of the PCI switches, wherein the PCM component configures all routings through the I/O fabric for the PCI switches by setting the configuration space for each of the PCI switches;

third instructions for detecting whether a particular PCI switch has been configured by another POM component in a different root node;

fourth instructions for, responsive to detecting that the particular PCI switch has been configured by the other PCM component in the different root node, implementing a challenge procedure to confirm whether the selected root node is the master root node, wherein the configuration space of the particular PCI switch is set by the PCM component of the selected root node if the selected root node is confirmed to be the master root node;

fifth instructions for continuing the configuration space querying procedure, if the selected root node is confirmed to be the master root node by the challenge procedure;

sixth instructions for aborting the configuration space querying procedure if the selected root node is not confirmed to be the master root node by the challenge procedure; and seventh instructions for, responsive to detecting that the particular PCI switch has not been configured by the other PCM component in the different root node, setting the configuration space for the particular PCI switch by the PCM component of the selected root node.

11. The computer program product of claim 10, wherein:

the challenge procedure comprises determining whether the selected root node meets a pre-selected criterion; and the criterion is derived from a comparison of values in a selected value field, wherein the value field is selected from a group of value fields that includes at least vital product data identification, user identification, and user priority for each of the root nodes.

12. The computer program product of claim 10, wherein:

detecting whether a particular PCI switch has been configured by another PCM component in a different root node comprises receiving a detected information having a data table entry indicating that the different root node is considered to be the master root node for the particular PCI switch.

13. The computer program product of claim 10, wherein:

the configuration space querying procedure is suspended while the challenge procedure is being carried out.

14. The computer program product of claim 10, wherein:

implementation of the challenge procedure requires a response within a specified time period, and the configuration querying procedure is aborted if the required response does not occur within the specified time period.

15. The computer program product of claim 10, wherein:

the selected root node, upon being confirmed to be the master root node, is operated to configure routings through each of the PCI switches, each of the configured routings corresponding only to one of the root nodes, and each routing providing a path for data traffic between its corresponding root node and one of the adapters, the routings being configured by the selected root node during a time when the remaining root nodes are respectively in a quiescent state.

16. An apparatus for a distributed computing system comprising:

a plurality of root nodes, each root node comprising a host system and a root complex, and one of the plurality of root nodes selected to be a master root node;

an input/output (I/O) fabric comprising a number of PCI buses and switches, the PCI switches being operable to connect the plurality of root nodes to share the same adapter;

a number of PCI adapters shared by the plurality of root nodes through the I/O fabric;

a PCM component residing in the selected root node and operable to implement a configuration space querying procedure whereby the selected root node iteratively queries a configuration space of each of said PCI switches, wherein the PCM component configures all routings through the I/O fabric for the PCI switches by setting the configuration space for each of the PCI switches;

a processor component for detecting whether a particular PCI switch has been configured by another PCM component in a different root node, and for implementing a challenge procedure to confirm whether the selected root node is the master root node in response to detecting that the particular PCI switch has been configured by the other PCM component in the different root node, wherein the configuration space of the particular PCI switch is set by the PCM component of the selected root node if the selected root node is confirmed to be the master root node; and the PCM component of the selected root node being further operable to set the configuration space for the particular PCI switch and continue the configuration space querying procedure, if the selected root node is confirmed to be the master root node by the challenge procedure, and abort the configuration space querying procedure if the selected root node is not confirmed to be the master root node by the challenge procedure.

17. The apparatus of claim 16, wherein:

the challenge procedure comprises determining whether the selected root node meets a pre-selected criterion; and the criterion is derived from a comparison of values in a selected value field, wherein the value field is selected from a group of value fields that includes at least vital product data identification, user identification, and user priority for each of said root nodes.

18. The apparatus of claim 16, wherein:

detecting whether a particular PCI switch has been configured by another PCM component in the different root node comprises receiving a detected information having a data table entry indicating that the different root node is considered to be the master root node for the particular PCI switch.

19. The apparatus of claim 16, wherein:

the PCM component suspends the configuration space querying procedure while the challenge procedure is being carried out.

20. The apparatus of claim 16, wherein:

the PCM component, during the implementation of the challenge procedure, requires a response within a specified time period, and aborts the configuration querying procedure if the required response does not occur within the specified time period.

* * * * *

UNITED STATES PATENT AND TRADEMARK OFFICE
CERTIFICATE OF CORRECTION

| | | |
|---|---|---|
| PATENT NO. | : 7,631,050 B2 | Page 1 of 1 |
| APPLICATION NO. | : 11/260624 | |
| DATED | : December 8, 2009 | |
| INVENTOR(S) | : Boyd et al. | |

It is certified that error appears in the above-identified patent and that said Letters Patent is hereby corrected as shown below:

Title Page:
Item [75], line 6, replace "Steven W. Thurber" with -- Steven M. Thurber --

Signed and Sealed this
Twenty-first Day of May, 2013

Teresa Stanek Rea
*Acting Director of the United States Patent and Trademark Office*